Dec. 27, 1955  M. G. MARRONE  2,728,375
CHILDREN'S COMBINED ROCKING AND WHEELED VEHICLE
Filed May 25, 1953  2 Sheets-Sheet 1
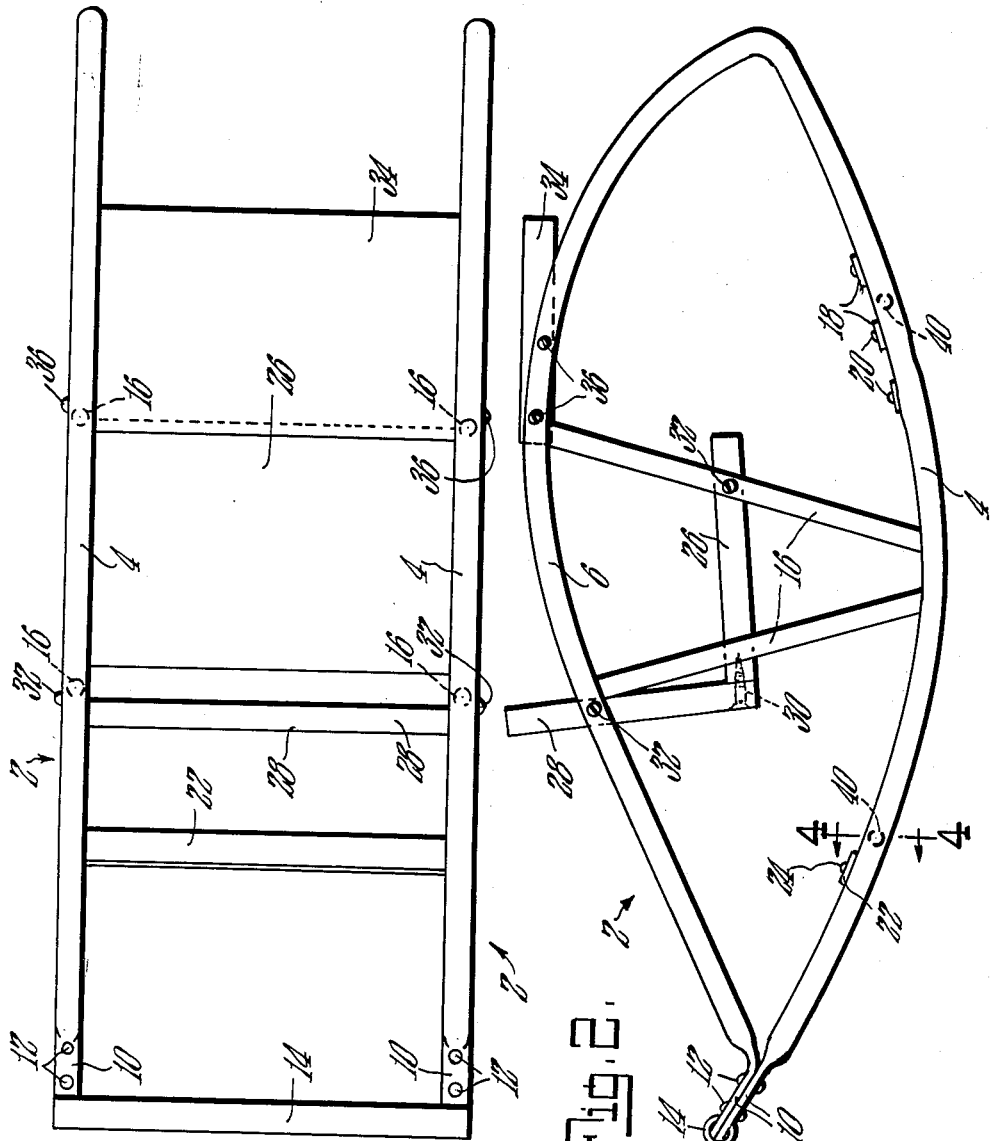
INVENTOR.
Michael G. Marrone.

Dec. 27, 1955　　　M. G. MARRONE　　　2,728,375
CHILDREN'S COMBINED ROCKING AND WHEELED VEHICLE
Filed May 25, 1953　　　　　　　　　　　　　2 Sheets-Sheet 2
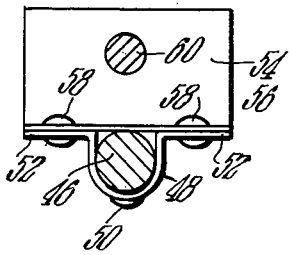
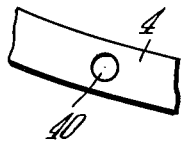
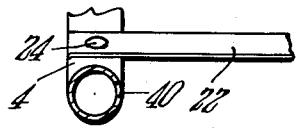
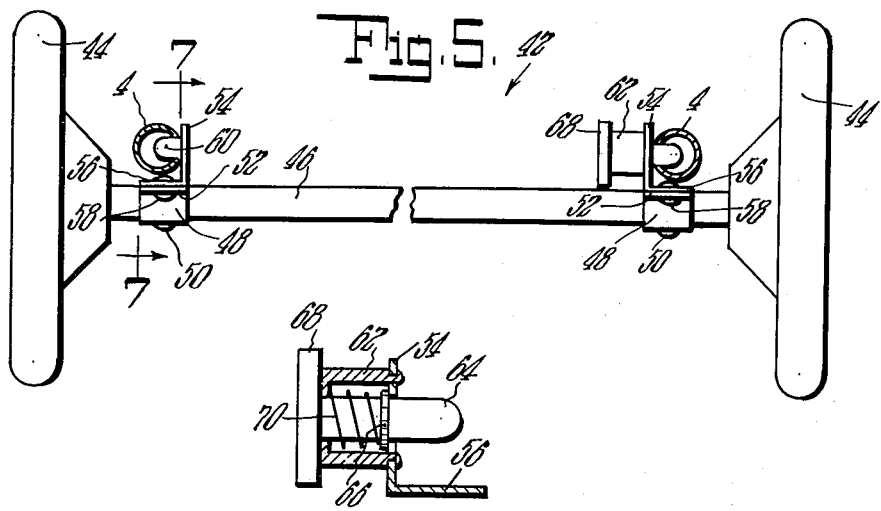
INVENTOR.
Michael G. Marrone.
BY Ross & Ross
Atty & Agent.

2,728,375

CHILDREN'S COMBINED ROCKING AND WHEELED VEHICLE

Michael G. Marrone, Ashburnham, Mass.

Application May 25, 1953, Serial No. 356,943

1 Claim. (Cl. 155—73)

This invention relates to improvements in children's vehicle and is directed more particularly to a combination rocking and wheeled vehicle.

The principal features of the invention are directed to the provision of a structure which is adapted for conversion between a wheeled and rockable vehicle.

According to one special feature of the invention, the structure includes side frames adapted for resting on the floor or the like for rocking motion of the vehicle and which are readily connectable to wheeled axles whereby the vehicle may be rolled along the floor.

According to another feature of the invention, the side frames are in the form of elongated hollow vertical ellipses having transverse members intermediate opposite ends thereof thereby to provide a lightweight strong structure.

All of the above objects I accomplish by means of such structure and relative arrangements of parts thereof, as will fully appear by a perusal of the description below and by various specific features which will be hereinafter set forth.

To the above cited and other ends and with the foregoing and various other novel features and advantages and other objects of my invention as will become more readily apparent as the description proceeds, my invention consists in certain novel features of construction and in the combination and arrangement of parts as will be hereinafter more particularly pointed out in the claim hereunto annexed and more fully described and referred to in connection with the accompanying drawings wherein:

Figs. 1 and 2 are side and plan elevational views of a vehicle embodying the novel features of the invention;

Fig. 3 is an elevational view of a portion of the lower part of one of the side frames of the vehicle shown in Figs. 1 and 2;

Fig. 4 is a sectional elevational view on the line 4—4 of Fig. 2;

Fig. 5 is an elevational view of the axle for the vehicle shown in Figs. 1 and 2;

Fig. 6 is an enlarged sectional elevational view through one side of the axle mechanism shown in Fig. 5; and Fig. 7 is a sectional elevational view on the line 7—7 of Fig. 5.

Referring now to the drawings more in detail, the invention will be fully described.

The vehicle is provided with side frames 2 which are preferably formed from single lengths of metal tubing shaped as ellipses having a lower curving rocking section 4 and upper sections 6.

Opposite ends of the tubing forming the side frames are flattened as at 10 and are secured together in some suitable manner as by rivets 12. A transverse end member 14 has opposite ends secured to the secured together ends of the side frame members by screws, welding or the like.

Struts 16 extend across the minor axis of the elliptical side frames between the lower and upper members 4 and 6 and have opposite ends secured thereto in some suitable manner as by welding.

The struts 16 may be made from metal tubing which is light in weight and contribute in the general arrangement to provide strong rigid side frames.

Forward transverse slats 18 extend between the lower members 4 of the side frames and have opposite ends secured thereto by screws 20. These slats 18 provide a foot rest for the occupant of the vehicle. A rear transverse slat 22 has its opposite ends secured to the lower members 4 by screws 24.

A seat 26 and back 28, secured together in some suitable manner as by screws such as 30, extend between the side frames and are secured thereto by screws 32.

A tray 34 extends between the side frames and is secured at its opposite ends to the upper members 6 by screws 36.

A child on the seat 26 due to the form of the lower member of the side frames may easily rock back and forth while, if desired, the vehicle may be rolled along the floor by means now to be described.

The lower members 4 of the side frames at inner sides thereof are provided with longitudinally spaced openings 40, see Figs. 3 and 4.

A pair of axle assemblies such as 42, in Fig. 5, are provided and have rubber tired wheels 44 rotatable on opposite ends of axles 46. Straps 48 extend around the axles and are secured thereto by rivets 50 or the like. Flanges 52 extend outwardly from the straps at opposite sides of the axles and vertically disposed plates 54 have feet 56 which are secured to the flanges by rivets 58 or the like.

A plate 54 at one end of each of the axles has a stud 60 fixed thereto. These studs 60 are receivable in the openings 40 of the lower member 4 of one of the side frames.

The plates 54 at the opposite ends of the axles have hollow hubs 62 secured thereto, see Fig. 6. Pilots 64 are slidable in the hubs 62 and plates and have collars 66 within the hubs. Manually engageable knobs 68 are fixed on outer ends of the pilots and springs 70 within the hubs 62 act on to urge the pilots 64 outwardly.

The axles are connected to the lower members 4 of the side frames by inserting the studs 60 in the openings 40 of one lower member 4. The pilots 64 at opposite ends of the axles are retracted against the action of the springs 70 and with the pilots in alignment with the openings 40 of the lower member 4 of the opposite side frame the pilots are released. The pilots enter the openings 40 and the axles are releasably locked to the lower members of the side frames.

The particular form and arrangement of the side frames provide a strong rigid supporting structure which is readily rockable on the floor and the axle mechanisms are easily and quickly applied to the side frames for rolling the vehicle along the floor.

The components may be assembled with screws whereby the parts will occupy small space for storing and shipping purposes.

The device is further adapted so that it may be used as a sled in the absence of the aforementioned wheels.

The invention may be embodied in other specific forms without departing from the essential characteristics thereof. Hence, the present embodiments are therefore to be considered in all respects merely as being illustrative and not as being restrictive, the scope of the invention being indicated by the appended claim rather than by the foregoing description, and all modifications and variations as fall within the meaning and purview and range of equivalency of the appended claim are therefore intended to be embraced therein.

What it is desired to claim and secure by Letters Patent of the United States is:

A child's vehicle for rocking or rollable along the floor and being convertible to a rocker comprising, a pair of similar side frames each consisting of a single length of tubular metal formed in the shape of an elongated oval having a horizontally disposed long axis and elongated lower and upper curving runs and a transverse member having opposite ends secured to opposite ends of the lengths of metal at the rear ends of said frames, spacing rear ends of said side frame transversely, relatively spaced transverse members having opposite ends secured to the lower runs of the side frames inwardly of the forward ends thereof spacing the lower runs of said side frames transversely and providing a foot rest, horizontally spaced vertically disposed struts intermediate opposite ends of the side frames having upper and lower ends secured to the upper and lower runs of the side frames, secured together seat and back members extending between the side frames having opposite ends secured to said struts and upper runs thereof spacing the upper runs of the side frames transversely, said lower runs of the side frames provided with longitudinally spaced openings in inner sides thereof with the openings of one run in alignment with corresponding openings of the run of the other side frame, elongated transverse axles having wheels on opposite ends thereof and having upstanding brackets with studs and spring-pressed pilots mounted on the brackets, the studs being insertable in the openings of the run of the adjacent said side frame and the pilots being receivable in the openings of the other of said side frames; said axle and wheel structure being detachable whereby the device is converted to a rocker.

References Cited in the file of this patent
UNITED STATES PATENTS

| | | |
|---|---|---|
| 471,639 | Horstmanonhoff | Mar. 29, 1892 |
| 1,413,510 | Wiggin | Apr. 18, 1922 |
| 1,607,283 | Korn | Nov. 16, 1926 |
| 2,512,995 | Berger | June 27, 1950 |

FOREIGN PATENTS

| | | |
|---|---|---|
| 92,471 | Austria | May 11, 1923 |
| 1,024,458 | France | Jan. 10, 1953 |